United States Patent
Hartung

(10) Patent No.: US 9,765,633 B2
(45) Date of Patent: Sep. 19, 2017

(54) BLADE CASCADE

(71) Applicant: MTU Aero Engines AG, Munich (DE)

(72) Inventor: Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 352 days.

(21) Appl. No.: 14/564,831

(22) Filed: Dec. 9, 2014

(65) Prior Publication Data

US 2015/0167478 A1   Jun. 18, 2015

(30) Foreign Application Priority Data

Dec. 16, 2013   (DE) .................. 10 2013 226 015

(51) Int. Cl.
*F01D 5/28* (2006.01)
*F01D 5/14* (2006.01)
(Continued)

(52) U.S. Cl.
CPC .............. *F01D 5/28* (2013.01); *F01D 5/14* (2013.01); *F01D 5/22* (2013.01); *F01D 5/26* (2013.01); *F04D 29/023* (2013.01); *F04D 29/324* (2013.01); *F04D 29/542* (2013.01); *F04D 29/666* (2013.01); *F05D 2260/961* (2013.01); *F05D 2300/607* (2013.01); *Y02T 50/671* (2013.01); *Y10T 29/49321* (2015.01)

(58) Field of Classification Search
CPC ..... F01D 5/28; F01D 5/14; F01D 5/22; F01D 5/26; F04D 29/023; F04D 29/324; F04D 29/542; F04D 29/666; Y10T 29/49321; Y02T 50/671; F05D 2260/961; F05D 2300/607

See application file for complete search history.

(56) References Cited

U.S. PATENT DOCUMENTS 4,605,452 A * 8/1986 Gemma .................. C30B 11/00
                                                148/404
6,379,112 B1 * 4/2002 Montgomery ............ F01D 5/10
                                                415/119
(Continued)

FOREIGN PATENT DOCUMENTS

EP      1 154 125      11/2001
EP      1 205 633       5/2002
(Continued)

*Primary Examiner* — Dwayne J White
*Assistant Examiner* — Eric Zamora Alvarez
(74) *Attorney, Agent, or Firm* — Davidson, Davidson & Kappel, LLC

(57) ABSTRACT

A blade cascade for a turbomachine, having a number of blades (11, . . . 14; 21, . . . 25; 31, . . . 37) which include a monocrystalline material, each blade having a crystal orientation value ($|\alpha|$), which is dependent on a crystal orientation of the monocrystalline material of the blade; the crystal orientation values of first blades (11, . . . 14) being less than a first limiting value and the crystal orientation values of second blades (21, . . . 25; 31, . . . 37) being at least equal to the first limiting value; and the blade cascade having at least one first sector (1), which includes at least three successive first blades (14, 12, 11, 13), and having at least one second sector (2+3; 2'+3'; 2"+3"), which includes at least three successive second blades (22, 21, 23, 24, 25; 31, 34, 36, 37, 33, 32, 35).

18 Claims, 1 Drawing Sheet

(51) Int. Cl.
*F04D 29/02* (2006.01)
*F04D 29/66* (2006.01)
*F04D 29/32* (2006.01)
*F04D 29/54* (2006.01)
*F01D 5/22* (2006.01)
*F01D 5/26* (2006.01)

(56) References Cited

U.S. PATENT DOCUMENTS

| | | | | |
|---|---|---|---|---|
| 6,478,544 | B2* | 11/2002 | Brandl | F01D 5/22 |
| | | | | 416/190 |
| 6,969,240 | B2* | 11/2005 | Strangman | B23P 15/006 |
| | | | | 415/191 |
| 8,206,117 | B2* | 6/2012 | Strangman | B23P 15/006 |
| | | | | 29/889.21 |
| 2001/0038793 | A1 | 11/2001 | Brandl et al. | |
| 2002/0074102 | A1 | 6/2002 | Wang | |
| 2014/0072432 | A1 | 3/2014 | Woehler et al. | |

FOREIGN PATENT DOCUMENTS

| | | |
|---|---|---|
| EP | 1 217 170 | 6/2002 |
| EP | 2 161 410 | 3/2010 |
| EP | 2 505 780 | 10/2012 |
| WO | WO 2013/186756 | 12/2013 |

* cited by examiner

BLADE CASCADE

This claims the benefit of German Patent Application DE 102013226015.6, filed Dec. 16, 2013 and hereby incorporated by reference herein.

The present invention relates to a blade cascade for a turbomachine, a turbomachine, in particular a gas turbine, having such a blade cascade, and a method for manufacturing such a blade cascade.

SUMMARY OF THE INVENTION

Manufacturing turbine stage moving blades of gas turbines, which are highly thermomechanically loaded, from monocrystalline materials having a predefined crystal orientation are known from internal company practice.

The crystal orientation of manufactured blades is checked. If it meets a predefined level of tolerance, the blade is installed, otherwise it is discarded. This results in a stochastic distribution of the crystal orientations within the blade cascade.

On the other hand, adapting the blades of a blade cascade to one another, in particular to improve the oscillation behavior of the cascade, is known from internal company practice.

It is an object of the present invention to provide an improved turbomachine.

The present invention provides a blade cascade, a turbomachine having a corresponding blade cascade and a method for manufacturing a corresponding blade cascade, respectively.

According to one aspect of the present invention, a turbomachine has at least one blade cascade. In one embodiment, the turbomachine is a gas turbine, in particular an aircraft engine gas turbine. In one embodiment, the blade cascade is a moving cascade or guide cascade of a turbine stage or compressor stage of the gas turbine, in particular the aircraft engine gas turbine.

The blade cascade has a number of blades which include a monocrystalline material. In one embodiment, the blade cascade is made of this number of blades or all blades include one, preferably the same monocrystalline material. In one embodiment, one or multiple, in particular all blades are made at least essentially of one, in particular the same monocrystalline material, in another embodiment, for example, only vanes of the blades may also include the monocrystalline material, for example, in particular may be made thereof. In one embodiment, the monocrystalline material includes a nickel, iron, titanium, aluminum, cobalt, niobium, and/or molybdenum alloy, in particular a superalloy, for example, CMSX-2, CMSX-3, PWA 1426, PWA 1480, PWA 1484, René, or CM 186 LC or the like, or is made thereof.

Each of the blades has a crystal orientation value, which is dependent on a crystal orientation of the monocrystalline material of this blade, in particular the crystal orientation of this type. The crystal orientation of the monocrystalline material in the meaning of the present invention may be dependent in particular on a deviation of one, in particular a crystal direction of this type, of the monocrystalline material from one, in particular a profile direction of this type, of a vane of the blade, in particular may describe it. The crystal direction may be in particular the direction, [100] direction, [110] direction, [111] direction, [112] direction, [123] direction, or the like, the specification "[XYZ]" identifying the Miller index, which is routine in the art, and which is also specified as "<XYZ>". The profile direction may be in particular the radial direction, the direction of the so-called stack or thread axis, the peripheral direction, the direction of a profile chord of the vane, or the like. In particular, the crystal orientation in the meaning of the present invention may thus be dependent on a deviation or an angle between the [001] direction of the monocrystalline material of the blade and the stack axis of the vane of the blade, in particular may describe it, which is also referred to as the primary crystal orientation. Similarly, the crystal orientation may also be dependent in particular on a deviation or an angle between the [100] direction of the monocrystalline material of the blade and the profile chord of the vane of the blade, in particular describe it, which is also referred to as the secondary crystal orientation. The crystal orientation value of a blade in the meaning of the present invention may accordingly be dependent in one embodiment on such a deviation, in particular its absolute value, in particular may describe it. In one refinement, the crystal orientation value includes, in particular is, the corresponding angle(s) or its absolute value. Hereafter, for a more compact description, the crystal orientation value is identified with $|\alpha|$, as is typical in particular for the primary crystal orientation.

According to one aspect of the present invention, the blades are sorted according to their crystal orientation or their crystal orientation value and subsequently situated in sectors of the blade cascade in accordance with their crystal orientation values. In this way, blades of similar crystal orientations may be combined in a targeted or planned way in particular.

Surprisingly, it has been shown that in this way, in relation to a purely stochastic and therefore randomly determined distribution of the crystal orientations within the cascade, in particular its oscillation behavior may be improved, in particular with regard to resonance and/or vibration. Additionally or alternatively, greater tolerances may thus be permitted in the crystal orientation, in that blades having greater crystal orientation values are not discarded, but rather combined in corresponding sectors. This may in particular reduce a reject rate during the manufacturing of the blades using monocrystalline material and may thus reduce the costs thereof.

The sorting of the blades according to their crystal orientation may include in particular nondestructive ascertainment of the crystal orientation, for example, the primary crystal orientation, and subsequent ordering of the blades according to their crystal orientation or their crystal orientation value. Thus, the crystal orientation may be ascertained, for example, by means of the Laue method. The ordering may include arraying the blades according to their crystal orientation values, for example, in ascending order, in particular, so that for the arrayed blades i=1, 2, . . . n, the following relationship applies: $|\alpha_1| \le |\alpha_2| \le \ldots \le |\alpha_n|$. Similarly, the ordering may include, in particular be, in one embodiment, a classification of the blades into classes A, B, . . . , so that for the classified blades i= 1, 2, . . . n, the following relationship applies: i∈A ⇔ $\alpha_{A0} \le |\alpha_i| \le \alpha_{A1}$, i∈B ⇔ $\alpha_{B0} \le |\alpha_i| \le \alpha_{B1}$, having the class limits $\alpha_{A0}$, $\alpha_{A1}$, $\alpha_{B0}$, $\alpha_{B1}$, . . . . Within a sector, the blades, which are arrayed in particular, may be situated in their order. Similarly, the blades, which are classified in particular, may also be situated irregularly within a sector, in particular to balance out the blade cascade or the like.

For a more compact description, without restriction of the generality, blades of the blade cascade, whose crystal orientation value is less than a first limiting value, are referred to as first blades, blades of the blade cascade, whose crystal orientation value is at least equal to the first limiting value, are referred to as second blades.

According to one aspect of the present invention, the blade cascade has at least one, in particular precisely one, or multiple first sector(s), which is/are made up of at least three, in particular at least four or at least five first blades which are successive or adjacent in the circumferential direction. In addition, the blade cascade has at least one, in particularly precisely one or multiple second sector(s), which is/are made up of at least three, in particular at least four or at least five second blades which are successive or adjacent in the circumferential direction. In that the sorted blades are situated in accordance with their crystal orientation values in sectors, one or multiple first sector(s) and one or multiple second sector(s) accordingly result, in which exclusively first or second blades, respectively, are combined or situated successively in the circumferential direction. In this way, as explained above, the oscillation behavior of the blade cascade may surprisingly be improved and/or costs may be reduced.

In one embodiment, the blade cascade may include one first sector and one second sector. In other words, the blade cascade may be virtually divided into two parts, each having at least three, in particular at least four or at least five, successive or adjacent blades, all blades of one part having crystal orientation values which are less than a limiting value, while all blades of the other, complementary part have crystal orientation values which are at least equal to this limiting value. As explained in greater detail hereafter, multiple such virtual divisions may be possible.

In a corresponding way, in one embodiment, the blade cascade may include two or three first sectors, which are separate from one another in particular, and two or three second sectors, which are separate from one another in particular. In other words, the blade cascade may be virtually divided into, for example, four parts, each having three successive or adjacent blades, all blades of two separate parts having crystal orientation values which are less than a limiting value, while all blades of the other two separate parts have crystal orientation values which are at least equal to this limiting value.

The combination of blades into sectors of at least three, in particular at least four or at least five, successive blades of similar crystal orientation may be further differentiated in one embodiment. In particular, the second blades may be subdivided in accordance with their crystal orientation still further into first second blades, whose crystal orientation value is at least equal to the first limiting value and at the same time is less than a second limiting value, and second second blades, whose crystal orientation value is at least equal to the second limiting value. For a more compact description, these second second blades of the blade cascade are also referred to in short hereafter as third blades. First second blades and second second blades therefore form the second blades together.

Accordingly, in one embodiment the blade cascade has at least one, in particular precisely one or multiple first second sector(s), which each are made up of at least three, in particular at least four or at least five first second blades which are successive or adjacent in the circumferential direction, and at least one, in particular precisely one or multiple second second or third sector(s), which each are made up of at least three, in particular at least four or at least five second second or third blades which are successive or adjacent in the circumferential direction and is/are also referred to in short hereafter as third sector(s).

In one embodiment, the blade cascade may include a first sector, a first second sector, and a second second sector. In other words, the blade cascade may be virtually divided into three parts each having at least three, in particular at least four or at least five, successive or adjacent blades, all blades of one part having crystal orientation values which are less than a limiting value, all blades of a further part having crystal orientation values which are at least equal to this limiting value and are less than a further limiting value at the same time, while all blades of the third part have crystal orientation values which are at least equal to this further limiting value. Similarly, the blade cascade may also have, instead of one, two or three first sectors, instead of one, also two or three first second sectors, and/or instead of one, also two or three second second sectors. Correspondingly, the blade cascade may include in particular two or three first sectors, which are separate from one another in particular, two or three first second sectors, which are separate from one another in particular, and/or two or three second second sectors, which are separate from one another in particular.

The sorting may be carried out according to one or multiple previously specified limiting values, in such a way that blades may be assigned to previously determined sectors. Similarly, for example, the blades may initially be arrayed or classified according to their crystal orientation values, subsequently one or multiple limiting values may be predefined in accordance with the frequency distribution of the crystal orientation values, and the blades may subsequently be assigned to determined sectors in accordance with these limiting values. For example, of 90 produced blades, if 60 blades have crystal orientation values $|\alpha_i|<x$ and in turn 30 of these blades have crystal orientation values $|\alpha_i|<y<x$, y may be a first limiting value, x may be a second limiting value, according to which the 90 blades are assigned to first and second sectors, or first and second second sectors or situated therein.

In particular if limiting values are previously predefined, in one embodiment, one, in particular first and/or second limiting value may be at least 10%, in particular at least 25% of a maximum crystal orientation value of the blade cascade, in particular the crystal orientation value of the blade of the blade cascade having the greatest crystal orientation value among all blades of the blade cascade or a maximum permissible crystal orientation value for the blade cascade. Additionally or alternatively, in one embodiment the, in particular first and/or second limiting value may be at most 90%, in particular at most 75% of the maximum crystal orientation value of the blade cascade. For example, if the primary crystal orientation in the blade cascade is at most 15° or an upper limit of 15° is predefined for the primary crystal orientation in the blade cascade, in one embodiment, a first limiting value may thus be 8°=15°·53%, and a second limiting value may be 12°=15°·80%.

In particular if limiting values are predefined in accordance with the frequency distribution of the crystal orientation values, in one embodiment, the blades of a first sector or all first sectors may each or together form at least 20%, in particular at least 35% of the blades of the blade cascade. Additionally or alternatively, the blades of the first sector or all first sectors may each or together form at most 80%, in particular at most 65% of the number of the blades of the blade cascade. Additionally or alternatively, in one embodiment, the blades of a second sector or all second sectors, in particular first and/or second second sectors, may each or together form at least 20%, in particular at least 35%, and/or at most 80%, in particular at most 65% of the number of the blades of the blade cascade.

Within one sector or multiple, in particular all sectors of the blade cascade, in one embodiment, the crystal orientation values of the blades may be situated regularly, in particular in a monotonous sequence, in particular monotonously increasing or decreasing in the rotational direction. In another embodiment, the crystal orientations are irregularly distributed or the crystal orientation values of the blades of one sector or multiple, in particular all sectors of the blade cascade are irregularly situated. This may be advantageous in particular to balance out the blade cascade by corresponding rearrangement of the blades within the sectors.

As emphasized at the outset, in one embodiment, the blade cascade is made of the above-explained sectors, i.e., all blades of the blade cascade are combined into corresponding sectors. In another embodiment, in addition to the above-explained sectors, the blade cascade may have still further blades, which may be situated in a refinement in particular individually or in pairs between first and second sectors and/or between first and second second sectors, with at least three, in particular at least four or at least five blades of similar crystal orientation in each case. The above-explained advantages may still also be at least partially achieved in this way, on the other hand, the flexibility in the arrangement of the blades advantageously being able to be increased.

BRIEF DESCRIPTION OF THE DRAWINGS

Other advantageous refinements of the present invention result from the subclaims and the following description of preferred embodiments.

DETAILED DESCRIPTION

Figure 1:
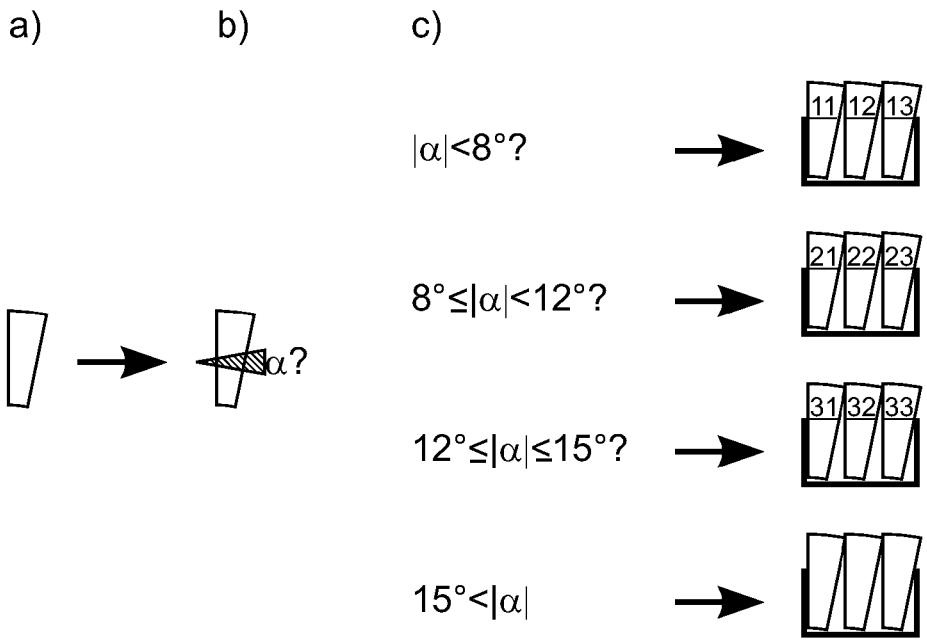
FIG. 1 shows a method for manufacturing the blade cascade of FIG. 2 according to one embodiment of the present invention.
Figure 2:
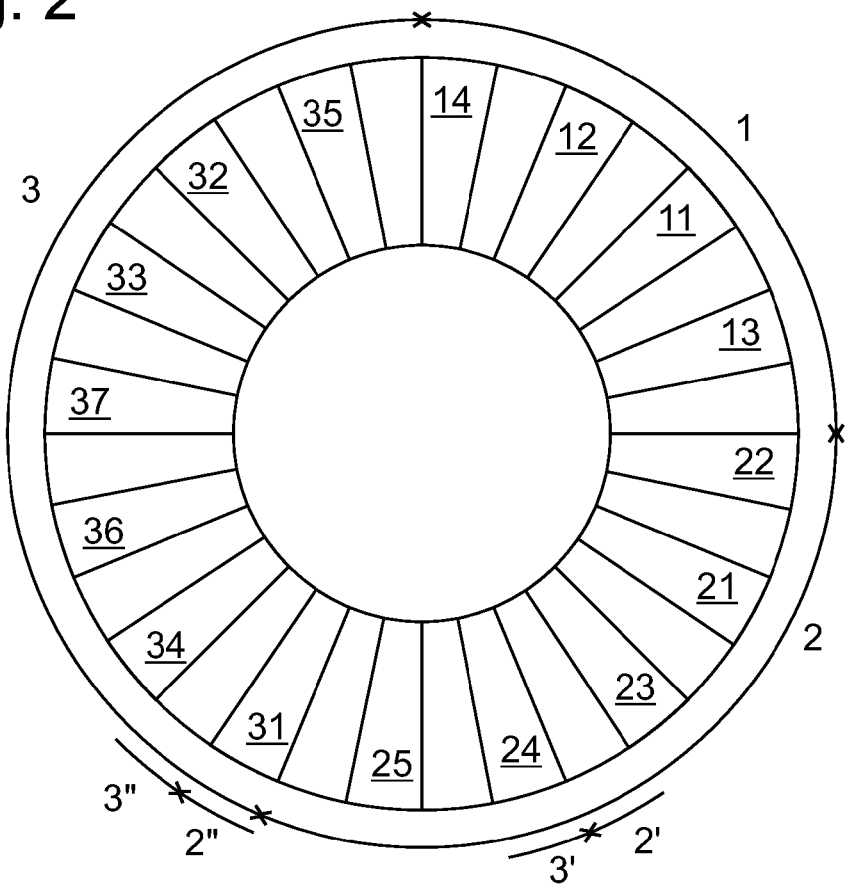
FIG. 2 shows a blade cascade of a turbomachine according to one embodiment of the present invention.

FIG. 2 shows a blade cascade of a turbomachine according to one embodiment of the present invention in an axial view; FIG. 1, in particular considered in conjunction with FIG. 2, shows a method for manufacturing this blade cascade.

In a first step, indicated in FIG. 1a), blades are manufactured from a monocrystalline material. For the manufactured blades, subsequently, in a step indicated in FIG. 1b), the absolute value of their primary crystal orientation is ascertained as crystal orientation value $|\alpha|$. Subsequently, the blades are classified in a step indicated in FIG. 1c) according to their crystal orientation or their crystal orientation value: for example, if their primary crystal orientation is less than 8°, the blades are assigned to a first class, which contains blades 11, 12, and 13, for example. If their primary crystal orientation is at least 8°, but less than 12°, for example, the blades are assigned to a second class, which contains blades 21, 22, and 23 in the example. If their primary crystal orientation is at least 12° and at most 15°, for example, the blades are thus assigned to a third class, which contains blades 31, 32, and 33 in the example. If their primary crystal orientation is greater than 15°, the blades are thus discarded as rejects. In particular this step represents sorting of blades in accordance with their crystal orientation.

For explanation purposes, the following relationship applies to blades 11, . . . 14, 21, . . . 25, 31, . . . 37, of which the blade cascade of FIG. 2 is made up: laid $<|\alpha_{11}|\leq|\alpha_{12}|\leq|\alpha_{13}|\leq|\alpha_{14}|<8°\leq|\alpha_{21}|\leq|\alpha_{22}|\leq|\alpha_{23}|\leq|\alpha_{24}|\leq|\alpha_{25}|<12°\leq|\alpha_{31}|\leq|\alpha_{32}|\leq|\alpha_{33}|\leq|\alpha_{34}|\leq|\alpha_{35}|\leq|\alpha_{36}|\leq|\alpha_{37}|\leq15°$.

The blades sorted in this way are situated according to their crystal orientation values in three sectors 1, 2, 3, of which the blade cascade of FIG. 2 is made up. All first blades 11, . . . 14, whose crystal orientation values $|\alpha_{1i}|$, i=1, . . . 4 are less than a first limiting value of 8°, are situated in first sector 1, all first second blades 21, . . . 25, whose crystal orientation values $|\alpha_{2i}|$, i=1, . . . 5 are at least equal to the first limiting value and at the same time less than a second limiting value of 12°, are situated in first second sector 2, and all second second or, in short, third blades 31, . . . 37, whose crystal orientation values $|\alpha_{3i}|$, i=1, . . . 7 are at least equal to the second limiting value, are situated in second second or, in short, third sector 3.

Within these sectors, the blades may be situated arbitrarily, in particular to balance out the blade cascade. The crystal orientation values of the blades are accordingly situated irregularly within the sectors, as indicated by sequence {14, 12, 11, 13; 22, 21, 23, 24, 25; 31, 34, 36, 37, 33, 32, 35} of the blades in the circumferential direction in FIG. 2.

Correspondingly, the manufactured blade cascade of FIG. 2 includes a number of 16 blades 14, 12, 11, 13; 22, 21, 23, 24, 25; 31, 34, 36, 37, 33, 32, 35 made of a monocrystalline material, each blade having a crystal orientation value $|\alpha|$ which is dependent on its primary crystal orientation. The crystal orientation values of first blades 11, . . . 14 are less than the first limiting value of 8°, and the crystal orientation values of second blades 21, . . . 25, 31, . . . 37 are at least equal to this first limiting value, the crystal orientations of first second blades 21, . . . 25 being less than the second limiting value of 12° and the crystal orientation values of second second blades 31, . . . 37 being at least equal to this second limiting value.

The blade cascade therefore includes a first sector 1, which includes four successive first blades 14, 12, 11, and 13, and a second sector 2+3, which includes 12 successive second blades 22, 21, 23, 24, 25; 31, 34, 36, 37, 33, 32, and 35. The second sector in turn includes a first second sector 2, which includes five successive first second blades 22, 21, 23, 24, and 25, and a second second sector 3, which includes seven successive second second blades 31, 34, 36, 37, 33, 32, and 35.

The first limiting value of 8° is 53% of the maximum crystal orientation value of the blade cascade of 15°, i.e., at least 25% and at most 75%. The second limiting value of 12° is 80% of the maximum crystal orientation value of the blade cascade of 15°, i.e., also at least 25% but only at most 90% of the maximum crystal orientation value of the blade cascade of 15°.

The four blades 14, 12, 11, and 13 of first sector 1 form 25% of the number of 16 blades of the blade cascade, the five blades 22, 21, 23, 24, and 25 of first second sector 2 form 31% of the number of 16, and the seven blades 31, 34, 36, 37, 33, 32, and 35 of second second sector 3 form 43% of the number of 16.

Although exemplary embodiments were explained in the preceding description, it is to be noted that a variety of alterations is possible.

It is apparent, for example, that the blade cascade may also be virtually divided into other sectors, each having at least three successive or adjacent blades. Thus, for example, a virtual classification into a first sector 1'={14, 12, 11, 13}, another first second sector 2'={22, 21, 23}, and another second second sector 3'={24, 25, 31, 34, 36, 37, 33, 32, 35} may also be carried out, or similarly a virtual classification into a first sector 1={14, 12, 11, 13}, a further other first second sector 2" {22, 21, 23, 24, 25, 31}, and a further other second second sector 3"={34, 36, 37, 33, 32, 35}, each of these sectors having at least three successive blades, whose crystal orientations or crystal orientation values are less than other first limiting values or are at least equal thereto and at the same time are less than other second limiting values. Similarly, in each case a sufficient combination of at least three blades of similar crystal orientations is shown each time. For the implementation of the above-explained features, it is sufficient in the meaning of the present invention if at least one corresponding virtual classification is possible, in which the particular features are fulfilled, in particular with regard to number, size, and/or distribution of blades, limiting values, and/or sectors.

In addition, it is to be noted that the exemplary embodiments are only examples, which should not restrict the scope of protection, the applications, and the structure in any way. Rather, a guideline for implementing at least one exemplary embodiment is given to those skilled in the art by the preceding description, diverse changes, in particular with regard to the function and arrangement of the described components, being able to be carried out without departing from the scope of protection, as it results from the claims and combinations of features equivalent thereto.

LIST OF REFERENCE NUMERALS

1 first sector
2; 2'; 2" first second sector
3; 3'; 3" second second sector
11, . . . 14 first blades
21, . . . 25 first second blades
31, . . . 37 second second blades

What is claimed is:

1. A blade cascade for a turbomachine, the blade cascade comprising:
a plurality of blades including a monocrystalline material, each blade having a crystal orientation value dependent on a crystal orientation of the monocrystalline material of the blade; and the respective crystal orientation values of first blades of the plurality of blades being less than a first limiting value and the respective crystal orientation values of second blades of the plurality of blades being at least equal to the first limiting value, at least one first sector including at least three successive first blades, and at least one second sector includes at least three successive second blades.

2. The blade cascade as recited in claim 1 wherein the at least one first sector has one, two, or three first sectors and the at least one second sector has one, two, or three second sectors.

3. The blade cascade as recited in claim 1 wherein the respective crystal orientation values of first second blades of the second blades of the plurality of blades are less than a second limiting value and the respective crystal orientation values of second second blades of the second blades of the plurality of blades are at least equal to the second limiting value; and the blade cascade has at least one first second sector including at least three successive first second blades, and at least one second second sector including at least three successive second second blades.

4. The blade cascade as recited in claim 3 wherein the at least one first sector has one, two, or three first sectors, the at least one first second sector has one, two, or three first second sectors, and the at least one second second sector has one, two, or three second second sectors.

5. The blade cascade as recited in claim 1 wherein the first limiting value is at least 10% or at most 90% of a maximum crystal orientation value of the blade cascade.

6. The blade cascade as recited in claim 5 wherein the first limiting value is at least 25% or at most 75% of the maximum crystal orientation value of the blade cascade.

7. The blade cascade as recited in claim 1 wherein the blades of the first or second sector form at least 20% or at most 80% of a number of the blades of the blade cascade.

8. The blade cascade as recited in claim 1 wherein the blades of the first or second sector form at least 35% or at most 65% of a number of the blades of the blade cascade.

9. The blade cascade as recited in claim 1 wherein the respective crystal orientation values of the blades of the first or second sector are situated regularly.

10. The blade cascade as recited in claim 1 wherein the respective crystal orientation values of the blades of the first or second sector are situated regularly in a monotonous sequence.

11. The blade cascade as recited in claim 1 wherein the respective crystal orientation values of the blades of the first or second sector are situated irregularly.

12. The blade cascade as recited in claim 1 wherein the crystal orientation of the monocrystalline material is dependent on a deviation of a crystal direction of the monocrystalline material from a profile direction.

13. The blade cascade as recited in claim 12 wherein the crystal direction is a [001] direction or [100] direction.

14. The blade cascade as recited in claim 12 wherein the profile direction is a stack axis or profile chord of a vane of the blade.

15. A turbomachine comprising at least one blade cascade as recited in claim 1.

16. The turbomachine as recited in claim 15 wherein the blade cascade is a moving cascade or guide cascade of a turbine stage or compressor stage.

17. A gas turbine comprising the turbomachine as recited in claim 15.

18. A method for manufacturing the blade cascade as recited in claim 1 comprising:
sorting blades according to the crystal orientation; and
arranging the sorted blades in the first and second sectors according to the respective crystal orientation values of the blades.

* * * * *